United States Patent
Chung (10) Patent No.: US 11,827,783 B2
(45) Date of Patent: Nov. 28, 2023

(54) RUBBER COMPOSITION FOR COVERING ELECTROMAGNETIC TAG AND ELECTROMAGNETIC TAG MODULE

(71) Applicant: NEXEN TIRE CORPORATION, Yangsan-si (KR)

(72) Inventor: Kyung Hoon Chung, Seoul (KR)

(73) Assignee: NEXEN TIRE CORPORATION, Yangsan-si (KR)

( * ) Notice: Subject to any disclaimer, the term of this patent is extended or adjusted under 35 U.S.C. 154(b) by 0 days.

(21) Appl. No.: 18/052,089

(22) Filed: Nov. 2, 2022

(65) Prior Publication Data

US 2023/0312888 A1 Oct. 5, 2023

(30) Foreign Application Priority Data

Nov. 3, 2021 (KR) .................. 10-2021-0149827

(51) Int. Cl.
*C08L 7/00* (2006.01)
*C08L 9/00* (2006.01)
*C08K 3/36* (2006.01)
*C08K 3/04* (2006.01)

(52) U.S. Cl.
CPC .................... *C08L 7/00* (2013.01); *C08K 3/04* (2013.01); *C08K 3/36* (2013.01); *C08L 9/00* (2013.01)

(58) Field of Classification Search
CPC .... C08L 7/00; C08L 9/00; C08K 3/04; C08K 3/36
See application file for complete search history.

(56) References Cited

U.S. PATENT DOCUMENTS

2009/0015415 A1* 1/2009 Uehara ............... B60C 23/0408
152/450

FOREIGN PATENT DOCUMENTS

| JP | 2007-230261 A | 9/2007 |
|---|---|---|
| JP | 5146309 B2 | 2/2013 |
| JP | 2018-502194 A | 1/2018 |
| JP | 2019-059468 A | 4/2019 |
| KR | 10-1059589 B1 | 8/2011 |
| KR | 10-1081374 B1 | 11/2011 |
| KR | 10-1340195 B1 | 12/2013 |
| KR | 10-1985614 B1 | 9/2019 |

OTHER PUBLICATIONS

Office Action dated Dec. 17, 2021 in Korean Application No. 10-2021-0149827.
Notice of Allowance dated Mar. 2, 2022 in Korean Application No. 10-2021-0149827.

* cited by examiner

*Primary Examiner* — Edward J Cain
(74) *Attorney, Agent, or Firm* — Knobbe, Martens, Olson & Bear, LLP (57) ABSTRACT

A rubber composition for covering an electromagnetic tag is proposed. The rubber composition may include a base rubber and a reinforcing filler comprising carbon black or boron nitride. The rubber composition may also include an insulating filler comprising at least one selected from silica, titanium dioxide, talc and calcium carbonate. The rubber composition may further include a reinforcing resin comprising an alkyl phenol formaldehyde resin or a resorcinol formaldehyde resin. Based on 100 parts by weight of the base rubber, the total amount of the reinforcing filler and the insulating filler may be 40 parts by weight or more, the amount of the insulating filler may be 10 parts by weight or more, and the amount of the reinforcing resin may be 0.5 parts by weight to 5 parts by weight.

6 Claims, 5 Drawing Sheets

RUBBER COMPOSITION FOR COVERING ELECTROMAGNETIC TAG AND ELECTROMAGNETIC TAG MODULE

CROSS-REFERENCE TO RELATED APPLICATION

This application is based on and claims priority under 35 U.S.C. §119 to Korean Patent Application No. 10-2021-0149827, filed on Nov. 3, 2021, in the Korean Intellectual Property Office, the disclosure of which is incorporated by reference herein in its entirety.

BACKGROUND

Technical Field

The present disclosure relates to a rubber composition for an electromagnetic tag cover and an electromagnetic tag module.

Description of Related Technology

Transportation means, for example, a vehicle that users operate, consists of many parts. Among them, the tire not only substantially affects the driving of transportation means, and, in particular, is one of the critical parts for securing the safety of users. Such tires may be used in various transportation means in addition to vehicles, for example, aircraft and other various transportation means.

SUMMARY

Embodiments of the present disclosure provide a rubber composition for an electromagnetic tag cover having excellent durability and radio wave recognition properties.

Embodiments of the present disclosure provide an electromagnetic tag module having excellent durability and radio wave recognition properties.

Additional aspects will be set forth in part in the description which follows and, in part, will be apparent from the description, or may be learned by practice of the presented embodiments of the disclosure.

A rubber composition for electromagnetic tag cover according to embodiments includes: a base rubber; a reinforcing filler; and an insulating filler, and has a specific resistance of $10^7$ $\Omega \cdot m$ or more.

In some embodiments, the reinforcing filler may include carbon black or boron nitride.

In some embodiments, the insulating filler may include at least one selected from silica, titanium dioxide, talc, and calcium carbonate.

In some embodiments, the rubber composition for the electromagnetic tag cover may include 10 parts by weight or more of the insulating filler based on 100 parts by weight of the base rubber.

In some embodiments, the total amount of the reinforcing filler and the insulating filler may be 40 parts by weight or more based on 100 parts by weight of the base rubber.

In some embodiments, the rubber composition for the electromagnetic tag cover may further include a reinforcing resin component.

An electromagnetic tag module according to embodiments includes: an electromagnetic tag; and a cover layer disposed on at least one surface of the electromagnetic tag, wherein the cover layer includes a base rubber, a reinforcing filler and an insulating filler, and has a specific resistance of $10^7$ $\Omega \cdot m$ or more.

In some embodiments, the cover layer may include a rubber composition including a base rubber, a reinforcing filler, an insulating filler, and a reinforcing resin component.

In some embodiments, the cover layer may have a modulus of 50 $kgf/cm^2$ or more.

In some embodiments, the cover layer may have a Shore A hardness of 50 HS or more.

In some embodiments, the cover layer may have a tensile strength of 150 $kgf/cm^2$ or more.

In some embodiments, the cover layer may be disposed on one surface of the electromagnetic tag, and a radio wave guide layer may be disposed on another surface opposite thereto.

Other aspects, features and advantages than those described above will become apparent from the following drawings, claims, and detailed description of the invention.

BRIEF DESCRIPTION OF THE DRAWINGS

The above and other aspects, features, and advantages of certain embodiments of the disclosure will be more apparent from the following description taken in conjunction with the accompanying drawings.

DETAILED DESCRIPTION

Radio-frequency identification (RFID) is a system that identifies IDs by using frequencies and a technology that recognizes information from a long distance by using radio waves. RFID is widely used to record measurement of goods and track product production histories. RFID is further used to record and recognize personal information. Compared to barcode systems, RFID can record more diverse information, and can assign serial numbers to each product.

Due to these features, there is a recent demand in the tire industry to apply RFID tags in tires to enable logistics and history management of tires in vehicle manufacturing and transportation stages. In addition, when the RFID tag in the tire is applied, the recognition rate is close to 100%, and the longer the recognition distance, the more advantageous the tire logistics and history management may have. Accordingly, research is being actively conducted to increase the recognition rate and recognition distance of RFID tags.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. The embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

The present disclosure may be subjected to various transformations and various embodiments. Specific embodiments are specified in the drawings and will be described in detail in the detailed description section. Effects and features of the present disclosure, and a method of achieving the same will become clear with reference to the embodiments described below in detail in conjunction with the drawings. However, the present disclosure is not limited to the embodiments disclosed below and may be implemented in various forms.

The present disclosure provides a rubber composition for an electromagnetic tag cover, the rubber composition including a base rubber, a reinforcing filler and an insulating filler, wherein the specific resistance of which is $10^7$ Ω·m or more. The rubber composition can effectively protect an electromagnetic tag and increase the recognition distance of radio waves.

In addition, the present disclosure provides an electromagnetic tag module and a tire, on which the rubber composition for an electromagnetic tag cover is applied.

Hereinafter, embodiments of the present disclosure will be described in detail with reference to the accompanying drawings, and when described with reference to the drawings, the same or corresponding components are given the same reference numerals, and the overlapping description thereof will be omitted.

In the following embodiments, terms such as first, second, etc. are used for the purpose of distinguishing one component from another, not in a limiting sense.

In the following examples, the singular expression includes the plural expression unless the context clearly dictates otherwise.

In the following embodiments, terms such as "include" or "have" means that the features or components described in the specification are present, and the possibility that one or more other features or components will be added is not excluded in advance.

In the drawings, the size of the components may be exaggerated or reduced for convenience of description. For example, since the size and thickness of each component shown in the drawings are arbitrarily indicated for convenience of description, the present disclosure is not necessarily limited to the embodiments illustrated in the drawings.

In the following embodiments, the x-axis, the y-axis, and the z-axis are not limited to three axes on a Cartesian coordinate system, and may be interpreted in a broad sense including the same. For example, the x-axis, y-axis, and z-axis may be orthogonal to each other, but may refer to different directions that are not orthogonal to each other.

In cases where certain embodiments may be implemented otherwise, a specific process sequence may be performed different from the described sequence. For example, two processes described in succession may be performed substantially simultaneously, or may be performed in an order opposite to the order described.

A rubber composition for an electromagnetic tag cover according to embodiments includes a base rubber, a reinforcing filler, and an insulating filler. The rubber composition for the electromagnetic tag cover and the electromagnetic tag cover formed therefrom may cover an electromagnetic tag to protect the electromagnetic tag from physical and mechanical impacts. In addition, due to excellent bonding and adhesive force with the rubber component of a tire body, the electromagnetic tag mounted on the tire may be effectively fixed.

The rubber composition for the electromagnetic tag cover and the electromagnetic tag cover formed therefrom have a specific resistance of $10^7$ Ω·m or more, so that an area in which electrical signals and radio waves are generated and acted may be limited to the inner area of the electromagnetic tag. Accordingly, radio emission and/or recognition efficiency of the electromagnetic tag may be increased.

Figure 1:
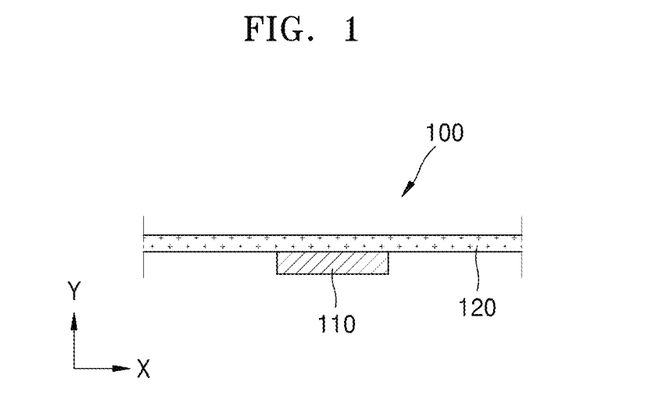
FIG. 1 shows a schematic cross-sectional view of an electromagnetic tag module according to some embodiments.

For example, in the case where a signal is transmitted through an electromagnetic tag 110 of an electromagnetic tag module 100, when the composition for an electromagnetic tag cover and a cover layer 120 have low resistance, the electrical signal is converted into electrical energy in the cover layer 120, or the occurrence of electrical interference is reduced to increase the efficiency of signal transmission, and as a result, the signal recognition distance can be increased. As a specific example, when the electromagnetic tag module 100 is in the form of an RFID tag, the signal recognition efficiency of the reader may be improved.

In some embodiments, the specific resistance of the rubber composition for the electromagnetic tag cover and the electromagnetic tag cover formed therefrom may be $3*10^7$ Ω·m or more, $5*10^7$ Ω·m or more, $10^{10}$ Ω·m or more, or $3*10^{10}$ Ω m or more.

The base rubber may include, but is not limited to, a rubber material capable of effectively bonding with the electromagnetic tag and the tire, and having impact resistance, so as to protect and fix the electromagnetic tag. For example, a rubber material may be natural rubber (NR), polyisoprene rubber (IR), various butadiene rubber (BR), various styrene butadiene copolymer rubber (SBR), acrylonitrile butadiene copolymer rubber (NBR), chloroprene rubber, ethylene propylenediene copolymer rubber, styrene isoprene copolymer rubber, styrene isoprene butadiene copolymer rubber, or isoprene butadiene copolymer rubber.

In some embodiments, the base rubber may include the same rubber material as the base rubber material constituting the tire body. In this case, the bonding force between the rubber composition and the tire body may be improved, and the rubber composition may effectively bond and fix the electromagnetic tag inside the tire.

The reinforcing filler may include, but is not limited to, a material that improves mechanical properties (e.g., strength and durability) of the rubber composition, and may include, for example, carbon black, acetylene black, boron nitride, and the like.

In some embodiments, the reinforcing filler may include carbon black or boron nitride. In some embodiments, the reinforcing filler may include carbon black, and in this case, the mechanical properties and resistance of the rubber composition may be effectively controlled.

The insulating filler may include, but is not limited to, a filler capable of reducing electrical conductivity of the entire rubber composition and increasing resistance thereby by having electrical insulating properties. For example, the insulating filler is an inorganic filler having a specific resistance greater than or equal to a predetermined value, and may include oxides or carbonates of metals and metalloids.

In some embodiments, the insulating filler may include at least one selected from silica ($SiO_2$), titanium dioxide ($TiO_2$), talc, and calcium carbonate ($CaCO_3$). In some embodiments, the insulating filler may include silica, and in this case, the resistance of the rubber composition may be effectively improved to $10^7$ Ω·m or more while excellent mechanical properties are retained.

In some embodiments, the insulating filler may be included in an amount of 10 parts by weight or more based on 100 parts by weight of the base rubber. In this case, the resistance of the rubber composition may be effectively adjusted to be $10^7$ Ω·m or more, and mechanical properties are also excellent, so that even during the movement of the tire, the electromagnetic tag may be effectively protected for a long period of time. In one embodiment, the insulating filler may be included in an amount of 30 parts by weight or more based on 100 parts by weight of the base rubber.

In some embodiments, the total amount of the reinforcing filler and the insulating filler may be 40 parts by weight or more based on 100 parts by weight of the base rubber. In this case, the resistance and mechanical properties of the rubber composition may be improved together. In one embodiment, the total amount of the reinforcing filler and the insulating filler may be 50 parts by weight or more based on 100 parts by weight of the base rubber.

In some embodiments, a reinforcing resin component may be further included. For example, the reinforcing resin component may include, but is not limited to, a resin component, which is bonded to each other or which forms a bond with other components included in the rubber composition for an electromagnetic tag cover or the tire, by heat or over time, so as to improve the mechanical properties of the rubber composition or the binding force thereof with the tire.

In some embodiments, the reinforcing resin component may include a phenol-based resin. For example, the reinforcing resin component may include an alkyl phenol-based resin, and may include an alkyl phenol formaldehyde resin, a resorcinol formaldehyde resin, and the like.

For example, the reinforcing resin component may include a phenol-based resin such as an alkyl phenol formaldehyde resin to increase the bonding strength between a hydroxyl group and a rubber-based base material, and the tensile strength of the cover layer 120 and the durability of the cover layer 120.

In embodiments, when the rubber composition for an electromagnetic tag cover contains the reinforcing resin component, the tensile strength may be secured, and when an insulating filler, such as silica, is used for the control of high resistance, the decrease in the bonding force between the rubber-based base materials may be reduced.

In some embodiments, the reinforcing resin component may be included in an amount of 0.5 parts by weight to 5 parts by weight, based on 100 parts by weight of the base rubber. In this case, the bonding force thereof with the rubber-based base material may be improved, and miscibility and compatibility thereof with the insulating filler may be improved. In some embodiments, the reinforcing resin component may be included in an amount of 1 parts by weight to 3 parts by weight based on 100 parts by weight of the base rubber.

In some embodiments, the reinforcing resin component may include a petroleum resin-based material, a coumaron inden resin, a cresol formaldehyde-based resin, and the like.

An electromagnetic tag module according to embodiments includes an electromagnetic tag and a cover layer disposed on at least one surface of the electromagnetic tag. The cover layer includes a base rubber, a reinforcing filler, and an insulating filler, and has a specific resistance of $10^7$ $\Omega \cdot m$ or more.

FIG. 1 shows a schematic cross-sectional view of an electromagnetic tag module according to some embodiments.

Referring to FIG. 1, the electromagnetic tag module 100 according to embodiments includes the electromagnetic tag 110 and the cover layer 120.

The electromagnetic tag module 100 may be configured to transmit or receive one or more signals. For example, the electromagnetic tag module 100 may include one or more electrical elements.

As a specific example, the electromagnetic tag module 100 may include a sensor element capable of confirming one or more pieces of information.

In some embodiments, the electromagnetic tag module 100 may include an electromagnetic tag, and such a chip may be formed to perform one or more processing, and may include other memory circuitry.

As an optional embodiment, the electromagnetic tag module 100 may include one or more antenna units, and such antenna units may be connected to the electromagnetic tag.

The electromagnetic tag 110 may transmit and receive wireless signals through electromagnetic waves. In some implementations, the electromagnetic tag 110 may include an RFID tag that uses a radio frequency domain.

The electromagnetic tag 110 may be configured to process one or more signals, and may include other memory circuitry.

The cover layer 120 may be disposed on at least one surface of the electromagnetic tag 110. For example, the cover layer 120 may be disposed adjacent to the electromagnetic tag 110. The cover layer 120 may fix the position of the electromagnetic tag 110 and protect the electromagnetic tag 110. In addition, by having a high resistance, the cover layer 120 may suppress loss of electromagnetic signals transmitted from and received by the electromagnetic tag 110, so as to improve signal transmission and recognition efficiency.

The cover layer 120 may be formed from a rubber composition including a base rubber, a reinforcing filler, and an insulating filler. In some embodiments, the cover layer 120 may be formed from a rubber composition further including a reinforcing resin component.

The cover layer 120 may have a high electrical resistance and may be disposed adjacent to the electromagnetic tag 110, to improve the efficiency of an electrical signal through the electromagnetic tag module 100. For example, a signal recognition distance for recognizing a signal of the electromagnetic tag module 100 may be increased.

Meanwhile, the cover layer 120 may be disposed between the electromagnetic tag 110 and one area of the tire body. As an optional embodiment, the electromagnetic tag 110 may be disposed so as not to be in a direct contact with the tire body due to the cover layer 120.

According to the present embodiment, the electromagnetic tag module 100 may include various other types of structures, and the type of RFID tag may be determined in various ways. For example, the electromagnetic tag module 100 may have a battery-embedded structure for the operation of the RFID, or may be a passive device type without a battery. In addition, when a memory is included in the electromagnetic tag provided in the RFID, reading and writing of the memory may be possible.

In some embodiments, the cover layer may have a modulus of 50 kgf/cm$^2$ or more. In some embodiments, the modulus of the cover layer may be 60 kgf/cm$^2$ or more.

In some embodiments, the cover layer may have a Shore A hardness of 50 HS or more. In some embodiments, the Shore A hardness of the cover layer may be 60 HS or more.

In some embodiments, the cover layer may have a tensile strength of 150 kgf/cm$^2$ or more. In some embodiments, the tensile strength of the cover layer may be 60 kgf/cm$^2$ or more.

In some embodiments, the cover layer may be disposed on one surface of the electromagnetic tag, and a radio wave guide layer may be disposed on the other surface opposite thereto.

Figure 2:
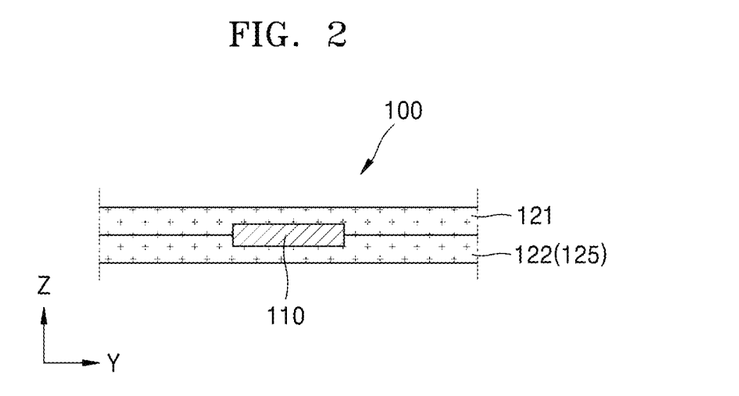
FIG. 2 shows a schematic cross-sectional view of an electromagnetic tag module according to some embodiments.

FIG. 2 shows a schematic cross-sectional view of an electromagnetic tag module according to some embodiments.

Referring to FIG. 2, the electromagnetic tag module 100 may include the electromagnetic tag 110, an upper cover layer 121 disposed on one surface (upper surface) of the electromagnetic tag 110, and a lower cover layer 122 disposed on an opposite surface (lower surface) of the electromagnetic tag 110.

For example, the electromagnetic tag 110 may be disposed between the upper cover layer 121 and the lower cover layer 122.

As an optional embodiment, the electromagnetic tag 110 may be disposed to be in close contact between the upper cover layer 121 and the lower cover layer 122. As an optional embodiment, the electromagnetic tag 110 may be disposed to be sealed by the upper cover layer 121 and the lower cover layer 122.

For example, the upper cover layer 121 and the lower cover layer 122 may be disposed to be connected to each other. In an embodiment, the upper cover layer 121 and the lower cover layer 122 may be disposed to be in contact with each other in an area where the electromagnetic tag 110 is not disposed. As such, the electromagnetic tag 110 may have a sealed shape between the upper cover layer 121 and the lower cover layer 122.

In some embodiments, the lower cover layer 122 may include a radio wave guide layer 125. For example, the radio wave guide layer 125 may be provided as the lower cover layer 122.

Since the radio wave guide layer 125 has a relatively low resistance compared to the upper cover layer 121, the signal transmission direction and signal transmission path of the electromagnetic tag 110 may be guided in the direction from the electromagnetic tag 110 to the radio wave guide layer 125. Accordingly, the signal emission and reception directions of the electromagnetic tag 110 may be concentrated in one direction, and the radio wave recognition efficiency in the corresponding direction may be improved. For example, when the radio wave guide layer 125 is placed to be the outside of the tire, even for a distance farther from the outside of the tire, the efficiency and reliability of wireless communication with the electromagnetic tag 110 may be improved.

In some embodiments, the specific resistance of the radio wave guide layer 125 may be less than $10^7$ Ω·m. In some embodiments, the specific resistance of the radio wave guide layer 125 may be less than $10^5$ Ω·m or less than $10^4$ Ω·m. In this case, the transmission/reception direction of radio waves of the electromagnetic tag module 100 is concentrated in the direction in which the radio wave guide layer 125 is formed, so that the radio wave recognition distance and efficiency in that direction may be improved.

In some embodiments, the radio wave guide layer 125 may have a Shore A hardness of 60 HS or more, a modulus of 70 kgf/cm$^2$ or more, and an elongation at break of 500% or more. In this case, the mechanical properties and durability of the electromagnetic tag module 100 may be improved, and the coupling and position fixing characteristics with respect to the tire may be further improved.

Each of the upper cover layer 121 and the lower cover layer 122 may be formed to have a length greater than a width. For example, the upper cover layer 121 and the lower cover layer 122 may have a width of 0.5 to 2 centimeters and a length of 4 to 6 centimeters. In addition, if necessary, the width and length of each of the upper cover layer 121 and the lower cover layer 122 may be variously determined according to the size and use of the tire to be applied.

In some embodiments, the radio wave guide layer 125 may include a second base rubber and a second reinforcing filler, wherein the second reinforcing filler may be included in an amount of 40 parts by weight or more based on 100 parts by weight of the second base rubber. The second base rubber may include the base rubber described above. The second reinforcing filler may include carbon black or acetylene black. In some embodiments, the second reinforcing filler may include 40 parts by weight or more of carbon black based on 100 parts by weight of the second base rubber. In some embodiments, the second reinforcing filler may further include 20 parts by weight or more of acetylene black based on 100 parts by weight of the second base rubber.

Figure 3:
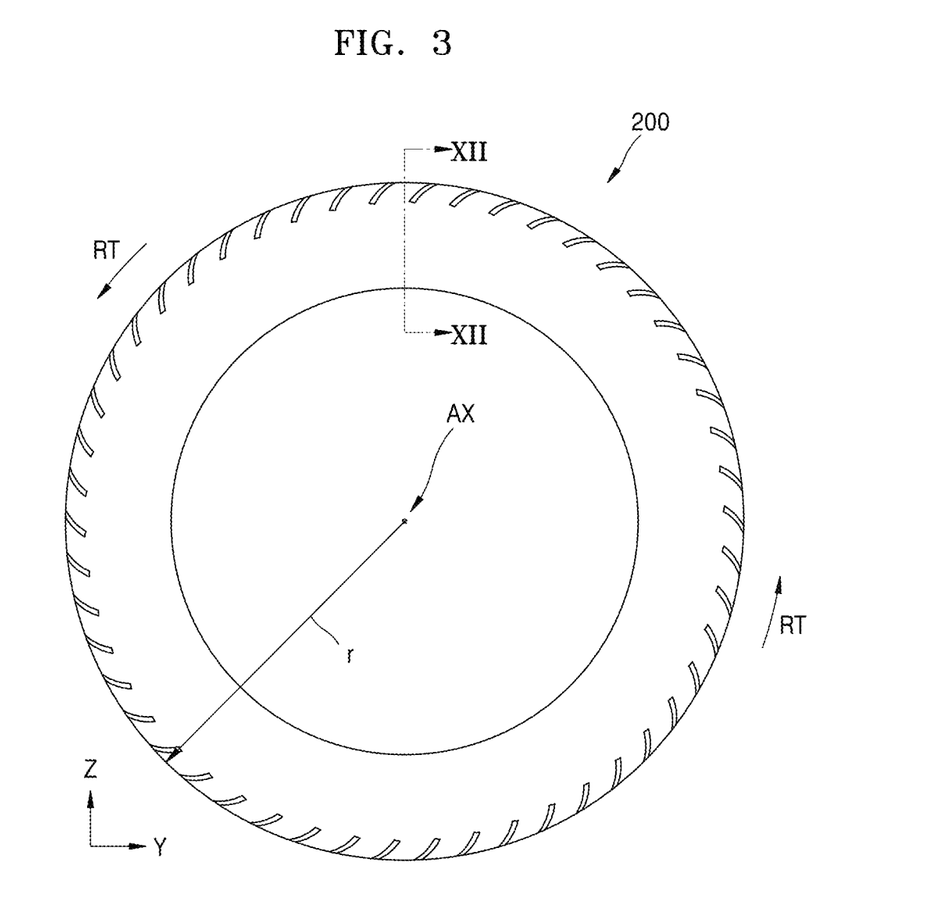
FIG. 3 shows a schematic front view of a tire according to some embodiments.
Figure 4:
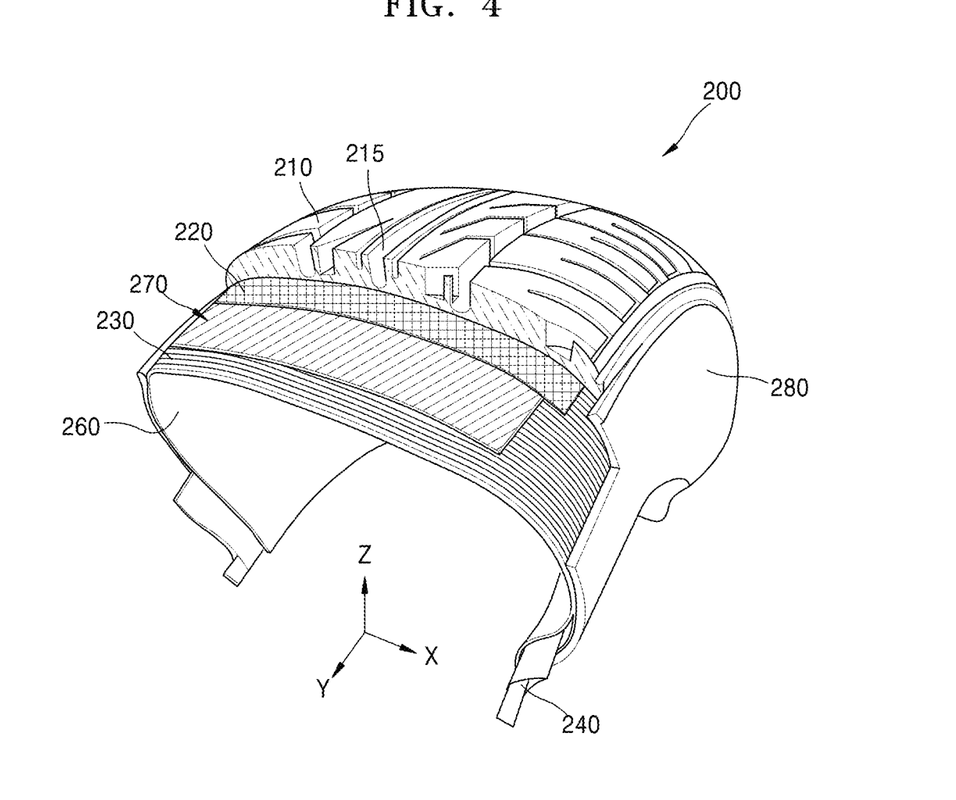
FIG. 4 shows a schematic, perspective cross-sectional view of a tire according to some embodiments.

FIG. 3 shows a schematic front view of a tire according to some embodiments; FIG. 4 shows a schematic, perspective cross-sectional view of a tire according to some embodiments; and FIG. 5 shows a schematic thickness-direction cross-sectional view of a tire 200 according to some embodiments.

Figure 5:
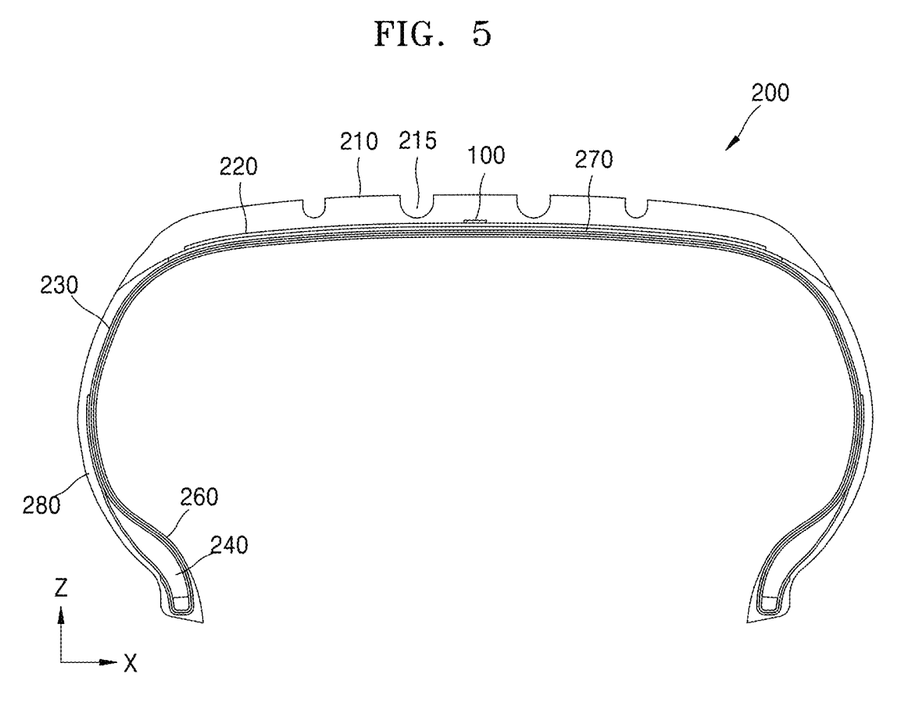
FIG. 5 shows a schematic thickness-direction cross-sectional view of a tire according to some embodiments.

Referring to FIGS. 3 to 5, the tire 200 may include a tire body part and the electromagnetic tag module 100.

The electromagnetic tag module 100 may be placed in the tire body part.

One or more signals may be transmitted or received through the electromagnetic tag module 100 disposed in the tire 200. For example, by using the RFID tag form, various information may be secured and used, including information about use of the tire 200, or information about the driving after the tire 200 is mounted on a vehicle.

In addition, since a variety of information about each tire can be easily managed, a variety of information in tire manufacturing, sales, and follow-up management can be easily and precisely managed.

The tire body part may be formed to include at least a tread area. For example, the tread area of the tire body part may include an area to be in contact with the surface of the road when the transportation means is driven. The tread area may have one or more patterns, and a plurality of grooves may be formed to be adjacent to these patterns. As an optional embodiment, the tire body portion may include a sidewall connected to the tread area, and for example, after the tire is mounted on a vehicle, a sidewall may be formed in an area facing the outside and the inside thereof.

The transportation means may be of various types, for example, may be vehicles, aircraft, and various other means to which tires can be applied.

The electromagnetic tag module 100 may be disposed in one area of the tire body, for example, in an inner area of the tire body part.

The tire according to the present embodiment may transmit or receive one or more signals by disposing an electromagnetic tag module in one area thereof. For example, the tire may secure and use various information by using an RFID tag.

In addition, since a variety of information about each tire can be easily managed, a variety of information in tire manufacturing, sales, and follow-up management can be easily and precisely managed.

Referring to FIGS. 3 to 5, the tire 200 of the present embodiment may include a tread part 210, a sidewall 280, and the electromagnetic tag module 100.

Referring to FIG. 3, the tire 200 may have a shape extending in a circumferential direction RT about a central axis AX. Also, a wheel (not shown) may be coupled to the inner side of the tire 200 in a radial direction r from the central axis AX.

The tread part 210 may include an area facing the surface of the road when the tire 200 is mounted on the vehicle and then driven. For example, the tread part 210 may include an area to be in contact with the surface of the road when the vehicle is driven.

The tread part 210 may be formed of various materials. For example, various additives may be to a rubber-based material base to manufacture the same.

The tread 210 may have one or more patterns, and a plurality of grooves 215 may be formed to be adjacent to these patterns. The grooves 215 may have a shape elongated in at least a first direction. Also, the grooves 215 may include an area having a shape that is elongated in a direction crossing the first direction.

The number and shape of the grooves 215 may be variously determined according to the driving characteristics and use of the tire 200.

The sidewall 280 may be connected to the tread part 210. As an optional embodiment, the tire 200 may include a bead part 240 to be effectively mounted on a wheel (not shown), and the sidewall 280 may be disposed between the tread part 210 and the bead part 240.

The sidewall 280 may include an area spaced apart from the surface of the road when the tire 200 is mounted on the vehicle and then driven. Through the sidewall 280, the tire 200 may perform a flexing/extension motion.

The sidewall 280 may be formed on both sides around the tread part 210 of the tire 200, and the material of the sidewall 280 on one side and the sidewall 280 on the other side may be the same.

As an optional embodiment, the material of the sidewall 280 on one side may be different from the material of the sidewall 280 on the other side.

As another optional embodiment, the modulus may vary by controlling the composition of the sidewall 280 of one side and the composition of the sidewall 280 of the other side to be different from each other.

As an optional embodiment, the bead part 240 may be formed in a portion of the area of the sidewall 280 opposite to the area connected to the tread part 210.

The bead unit 240 may have various shapes, and may be formed to include, for example, a core area and a buffer area.

The core area of the bead part 240 may have a wire bundle-shaped area having a square or hexagonal shape in which rubber is coated on a wire, for example, a steel wire.

The buffer area of the bead part 240 is formed to surround the core area, and may distribute the load to the core area, and may alleviate the external impact.

Also, the tire 200 may include a body ply 230 in at least an area overlapping the tread part 210.

The body ply 230 constitutes the main skeleton of the tire 200, and may support the load received by the tire 200 and may absorb the impact of the surface of the road. As an optional embodiment, the body ply 230 may include a cord form.

As an optional embodiment cap ply 220 may be placed between the body ply 230 and the tread part 210. The cap ply 220 may include various materials, and may have a plurality of cord shapes.

As an alternative embodiment, a belt layer 270 may be further disposed between the cap ply 220 and the body ply 230. The belt layer 270 may reduce the impact that the tire 200 receives from the surface of the road when the vehicle equipped with the tire 200 is running and may expand the ground surface of the tread part 210 to improve the grounding characteristics and driving stability.

The belt layer 270 may be formed in various forms, for example, may include a plurality of layers.

As an optional embodiment, an inner liner 260 may be disposed on the inside of the body ply 230. The inner liner 260 may be disposed on the innermost side of the tire 200 to reduce or prevent air leakage.

The inner liner 260 may include various materials, and may contain, for example, a rubber-based material to be attached to an adjacent layer. In addition, as an optional embodiment, the inner liner 260 may contain an organic material or an inorganic material.

The electromagnetic tag module 100 may be disposed in one area of the tire 200, for example, inside the tread part 210.

The electromagnetic tag module 100 may be configured to transmit or receive one or more signals, and may be one of the electromagnetic tag module 100 described in one of the embodiments described above.

In an embodiment, the electromagnetic tag module 100 may be a sensor device that may identify one or more pieces of information, and in another embodiment, the electromagnetic tag module 100 may be an electronic device using a radio frequency and may include a tag that is used for RFID. As a specific example, the electromagnetic tag module 100 may include an electromagnetic tag 110 and one or more antenna units. The electromagnetic tag 110 may be configured to perform one or more processes, and may include other memory circuitry.

The present embodiment may include various types of structures in addition to the electromagnetic tag module 100, and various types of RFID tags may be determined. For example, unlike the above, the electromagnetic tag module 100 may be in the form of a tag without an electromagnetic tag depending on the use. In addition, the electromagnetic tag module 100 may be a battery-embedded structure for the operation of the RFID, or a passive device type without a battery. In addition, when a memory is included in the electromagnetic tag 100 provided in the RFID, reading and writing of the memory may be possible.

The electromagnetic tag module 100 may be disposed in various ways, for example, in a form of being inserted into the tread part 210. For example, the electromagnetic tag module 100 may be arranged in advance during the manufacturing process of the tire 200 including the tread part 210 and integrally formed during the forming process. Also, as another example, the electromagnetic tag module 100 may be inserted and disposed after the forming process of the tire 200 including the tread part 210 is performed.

On the other hand, the electromagnetic tag module 100 may transmit or receive various signals, during which an electrical circuit may be operated. At this time, the electromagnetic tag module 100 may be inserted into the tread part 210 to make a contact, for example, a close contact, and accordingly, stable driving may be easily secured.

As such, the present disclosure has been described with reference to the embodiments shown in the drawings, which are an example only, and those skilled in the art would understand that various modifications and equivalent other embodiments can be made therefrom. Accordingly, the true technical protection scope of the present disclosure should be determined by the technical spirit of the appended claims.

The specific implementations described in embodiments are only examples, and do not limit the scope of the embodiment in any way. In addition, unless there is a specific reference such as "essential" or "important", it may not be a necessary component for the application of the present disclosure.

The use of the term "the" in the specification of embodiments (especially in the claims) may be in both the singular and the plural. In addition, when "a range" is described in an embodiment, that case includes the disclosure to which individual values belonging to the range are applied (unless there is a description to the contrary), and each individual value constituting the range is described in the detailed description. Finally, the steps constituting the method according to an embodiment may be performed in an appropriate order unless the order is explicitly stated or there is no description to the contrary. The embodiments are not necessarily limited according to the order of description of the steps. In an embodiment, the use of all examples or exemplary terms (e.g., etc.) is merely for describing the embodiment in detail, and unless it is limited by the claims, the scope of the embodiment is limited due to the examples or exemplary terminology. In addition, those skilled in the art may understand that the present disclosure can be configured according to design conditions and factors within the scope of the appended claims or equivalents thereof to which various modifications, combinations, and changes are made.

Hereinafter, it will be described in more detail through examples. However, these examples are for illustrative purposes of one or more embodiments, and the scope of the present disclosure is not limited to these examples.

Preparation Examples 1 to 7: Preparation of rubber composition for electromagnetic tag cover As the base rubber, based on 100 parts by weight of natural rubber (SMR #20) or diene rubber (SBR 1500/KBR01, KKPC), carbon black (N-339/N-660, OCI), acetylene black (Denka), silica ($SiO_2$, HD-165GRN, quenchen silicone chemical), and a phenol formaldehyde resin (SL-2201, SINO LEGEND) were compounded to prepare a rubber composition for an electromagnetic tag cover.

TABLE 1

| Division | Preparation Example 1 | Preparation Example 2 | Preparation Example 3 | Preparation Example 4 | Preparation Example 5 | Preparation Example 6 | Preparation Example 7 |
|---|---|---|---|---|---|---|---|
| Base rubber | 100 | 100 | 100 | 100 | 100 | 100 | 100 |
| Carbon black | 40 | 50 | 35 | 15 | 20 | 5 | 15 |
| Acetylene Black | 30 | 0 | 0 | 0 | 0 | 0 | 0 |
| Silica | 0 | 0 | 15 | 35 | 80 | 110 | 35 |
| Phenol-formaldehyde-based resin | 0 | 0 | 0 | 0 | 0 | 0 | 2 |
| Total additives other than rubber | 70 | 50 | 50 | 50 | 100 | 115 | 50 |

Experimental Example 1: Evaluation of electrical properties of rubber composition for electromagnetic tag cover Specimens having a width of 15 cm×a height of 3 cm×a thickness of 0.5 mm were prepared from the rubber composition for electromagnetic tag cover of Preparation Example, and the specific resistance of each specimen was measured using an electrical conductivity measuring device, and is shown in Table 2.

Experimental Example 2: Evaluation of mechanical properties of rubber composition for electromagnetic tag cover A specimen in the form of a dumbbell was prepared according to ASTM D412 from the rubber composition for electromagnetic tag cover of Preparation Example. For each specimen, Shore A hardness, modulus, tensile strength, and elongation at break were measured by using a tensile tester (Instron-3366), and are shown in Table 2.

Experimental Example 3: Evaluation of radio wave recognition distance of rubber composition for electromagnetic tag cover After preparing two cover layers, each having a thickness of 0.5 mm, from the rubber composition for the electromagnetic tag cover of each preparation example, the cover layers were respectively placed on both sides of the RFID tag and the two cover layers were pressed so that they were in close contact with each other to prepare an electromagnetic tag module.

The electromagnetic tag module was inserted into the bead part of the tire, vulcanized in a mold to prepare a sample tire, and the maximum recognition distance was measured through a portable RFID reader (ZEBRA RFD8500). The measurement values are shown in Table 2.

TABLE 2

| Division | Preparation Example 1 | Preparation Example 2 | Preparation Example 3 | Preparation Example 4 | Preparation Example 5 | Preparation Example 6 | Preparation Example 7 |
|---|---|---|---|---|---|---|---|
| Specific resistance ($\Omega$ m) | $1.2 \times 10^3$ | $3.51 \times 10^4$ | $4.0 \times 10^7$ | $4.0 \times 10^{10}$ | $4.0 \times 10^{12}$ | $4 \times 10^{13}$ | $4.0 \times 10^7$ |
| Shore A Hardness (HS) | 71 | 61 | 56 | 60 | 66 | 70 | 60 |
| Modulus (kgf/cm$^2$) | 80 | 75 | 55 | 64 | 73 | 68 | 78 |
| Tensile strength (kgf/cm$^2$) | 110 | 190 | 150 | 170 | 170 | 163 | 200 |
| Elongation at break (%) | 500 | 570 | 620 | 410 | 550 | 640 | 450 |
| Maximum recognition distance (cm) | 21.0 | 30.8 | 35.1 | 39.1 | 45.1 | 46.0 | 45.9 |

Referring to Table 2, in the case of an electromagnetic tag covered with the rubber compositions for electromagnetic tag cover in Preparation Examples having a specific resistance of $10^7$ Ω m or more, it was confirmed that the maximum recognition distance of radio waves was increased, and mechanical properties, such as hardness, modulus, tensile strength, and elongation at break, were improved.

Preparation Examples 8 to 12: Preparation of electromagnetic tag module and evaluation of radio wave recognition distance Electromagnetic tag modules were prepared in the same manner as in Experimental Example 3, except that cover layers on upper and lower surfaces of an RFID tag were formed of the rubber composition for the electromagnetic tag cover shown in Table 3 below.

The electromagnetic tag module was inserted into a bead filler of a tire so that the upper surface of the RFID tag faces the outside of the tire and the lower surface faces the inside of the tire, and then, vulcanized in a mold to prepare a sample tire, and a maximum recognition distance was measured through a portable RFID reader (ZEBRA RFD8500), and is shown in Table 3 below.

TABLE 3

| Division | | Preparation Example 8 | Preparation Example 9 | Preparation Example 10 | Preparation Example 11 | Preparation Example 12 |
|---|---|---|---|---|---|---|
| Cover layer | Upper (outside) | Preparation Example 3 | Preparation Example 4 | Preparation Example 3 | Preparation Example 1 | Preparation Example 1 |
| | Lower (inner) | Preparation Example 1 | Preparation Example 1 | Preparation Example 3 | Preparation Example 5 | Preparation Example 6 |
| Maximum recognition distance (cm) | | 20.8 | 22.9 | 35.1 | 44.1 | 45.9 |
| Preparation Example 10 reference ratio (%) | | 59.3 | 65.2 | 100.0 | 125.6 | 130.8 |

Referring to Table 3, in the case of an electromagnetic tag whose inner side is covered with a rubber composition with a resistivity of $10^7$ Ω·m or more and the outer side thereof is covered with a rubber composition with a specific resistance of less than $10^7$ Ω·m, the maximum recognition distance of radio waves was increased compared to the case of an electromagnetic tag having both sides covered with the same electromagnetic tag.

The rubber composition for an electromagnetic tag cover according to the embodiments includes a reinforcing filler and an insulating filler, and has a specific resistance of $10^7$ Ω·m or more, effectively protecting an electromagnetic tag mounted on a tire from physical and mechanical impacts, and increasing the radio wave recognition distance.

In an electromagnetic tag module according to embodiments, a direction in which a radio wave is radiated is guided in an outward direction of a tire, so that a radio wave recognition distance and a recognition rate with respect to the outward direction of the tire can be improved.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A rubber composition for covering an electromagnetic tag, the rubber composition comprising:
a base rubber;
a reinforcing filler comprising carbon black or boron nitride;
an insulating filler comprising at least one selected from silica, titanium dioxide, talc and calcium carbonate; and
a reinforcing resin comprising an alkyl phenol formaldehyde resin or a resorcinol formaldehyde resin,
wherein, based on 100 parts by weight of the base rubber, the total amount of the reinforcing filler and the insulating filler is 40 parts by weight or more, the amount of the insulating filler is 10 parts by weight or more, and the amount of the reinforcing resin is 0.5 parts by weight to 5 parts by weight,
wherein the base rubber includes at least one selected from natural rubber, polyisoprene rubber, butadiene rubber, styrene butadiene copolymer rubber, acrylonitrile butadiene copolymer rubber, chloroprene rubber, ethylene propylenediene copolymer rubber, styrene isoprene copolymer rubber, styrene isoprene butadiene copolymer rubber, and isoprene butadiene copolymer rubber,
wherein a specific resistance is $10^7$ Ω m or more, and
wherein a tensile strength is 160 kgf/cm$^2$ or more.

2. An electromagnetic tag module comprising:
an electromagnetic tag; and
a cover layer disposed on at least one surface of the electromagnetic tag,
wherein the cover layer comprises:
a base rubber;
a reinforcing filler comprising carbon black or boron nitride;
an insulating filler comprising at least one selected from silica, titanium dioxide, talc and calcium carbonate; and
a reinforcing resin comprising an alkyl phenol formaldehyde resin or a resorcinol formaldehyde resin,
wherein, based on 100 parts by weight of the base rubber, the total amount of the reinforcing filler and the insulating filler is 40 parts by weight or more, the amount of the insulating filler is 10 parts by weight or more, and the amount of the reinforcing resin is 0.5 parts by weight to 5 parts by weight,
wherein the base rubber includes at least one selected from natural rubber, polyisoprene rubber, butadiene rubber, styrene butadiene copolymer rubber, acrylonitrile butadiene copolymer rubber, chloroprene rubber, ethylene propylenediene copolymer rubber, styrene isoprene copolymer rubber, styrene isoprene butadiene copolymer rubber, and isoprene butadiene copolymer rubber, wherein a specific resistance is $10^7$ Ω m or more, and wherein a tensile strength is 160 kgf/cm$^2$ or more.

3. The electromagnetic tag module of claim 2, wherein the cover layer includes a rubber composition including a base rubber, a reinforcing filler, an insulating filler, and a reinforcing resin component.

4. The electromagnetic tag module of claim 2, wherein the cover layer has a modulus of 50 kgf/cm$^2$ or more.

5. The electromagnetic tag module of claim 2, wherein, the cover layer has a Shore A hardness of 50 HS or more.

6. The electromagnetic tag module of claim 2, wherein the cover layer is disposed on one surface of the electromagnetic tag, and a radio wave guide layer is disposed on another surface opposite thereto.

* * * * *